(12) United States Patent
Iwasaki et al.

(10) Patent No.: US 7,666,531 B2
(45) Date of Patent: Feb. 23, 2010

(54) PERPENDICULAR MAGNETIC RECORDING MEDIUM AND MAGNETIC RECORDING/REPRODUCTION APPARATUS

(75) Inventors: Takeshi Iwasaki, Yokohama (JP); Akira Kikitsu, Yokohama (JP); Soichi Oikawa, Hachioji (JP); Tomoyuki Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 601 days.

(21) Appl. No.: 11/312,429

(22) Filed: Dec. 21, 2005

(65) Prior Publication Data
US 2006/0141292 A1 Jun. 29, 2006

(30) Foreign Application Priority Data
Dec. 27, 2004 (JP) ............................ 2004-378169

(51) Int. Cl.
*G11B 5/66* (2006.01)
(52) U.S. Cl. .................................. 428/831.2
(58) Field of Classification Search ....... 428/800–848.9
See application file for complete search history.

(56) References Cited
U.S. PATENT DOCUMENTS
6,596,418 B2 7/2003 Maesaka et al.
7,195,827 B2 * 3/2007 Maeda et al. ............ 428/831
2002/0068199 A1 * 6/2002 Futamoto et al. ....... 428/694 TS
2002/0135954 A1 9/2002 Yoshikawa et al.
2003/0022023 A1 1/2003 Carey et al.
2003/0108776 A1 6/2003 Chang et al.
2004/0058197 A1 3/2004 Nakamura et al.
2004/0131890 A1 7/2004 Kikitsu et al.
2004/0161638 A1 8/2004 Maeda et al.
2004/0229083 A1 * 11/2004 Maeda et al. ............ 428/694 T FOREIGN PATENT DOCUMENTS
JP 2003-36525 2/2003
JP 2004-30767 1/2004
JP 2004-193523 7/2004
JP 2004-214251 A 7/2004
JP 2004-220737 8/2004

* cited by examiner

*Primary Examiner*—Holly Rickman
*Assistant Examiner*—Linda Chau
(74) *Attorney, Agent, or Firm*—Pillsbury Winthrop Shaw Pittman, LLP (57) ABSTRACT

At least three underlayers, i.e., a first underlayer containing, as a main component, at least one element selected from Ag, Ir, Ni, Pd, Pt, Rh, Hf, Re, Ru, Ti, Ta, Zr, Mg, and Al, a second underlayer containing Mg or Al and Si, and a third underlayer containing, as a main component, at least one element selected from Pt, Pd, Ru, Rh, Co, and Ti, are formed between a substrate and magnetic recording layer.

22 Claims, 6 Drawing Sheets

PERPENDICULAR MAGNETIC RECORDING MEDIUM AND MAGNETIC RECORDING/REPRODUCTION APPARATUS

CROSS-REFERENCE TO RELATED APPLICATIONS

This application is based upon and claims the benefit of priority from prior Japanese Patent Application No. 2004-378169, filed Dec. 27, 2004, the entire contents of which are incorporated herein by reference.

BACKGROUND OF THE INVENTION

1. Field of the Invention

The present invention relates to a perpendicular magnetic recording medium used in, e.g., a hard disk drive using the magnetic recording technique, and a magnetic recording/reproduction apparatus using the same.

2. Description of the Related Art

While large-capacity hard disk drives have been desired in recent years, the increase in medium noise is becoming a problem as the recording density increases. The main cause of the medium noise is presumably a zigzagged magnetic domain wall in a bit boundary. That is, the bit shape is determined in accordance with various factors such as the writing magnetic field of a head and the size of magnetic crystal grains forming the medium. The medium noise is produced particularly because the formation position of the bit boundary is indefinite due to variations in grain size. To reduce the noise, the unevenness of the recording bit boundary must be made as small as possible. To reduce the unevenness of the recording bit boundary, it is possible to downsize magnetic crystal grains forming the magnetic recording layer.

If downsizing of the magnetic crystal grains advances, however, the thermal decay resistance of the magnetic recording layer decreases at the same time. To reduce the unevenness of the recording bit boundary while the thermal decay resistance of the magnetic crystal grains is maintained, it is effective to make the grain diameter distribution uniform. However, it is difficult to make the grain diameter distribution uniform while the grain diameter of the crystal grains is maintained at about 10 nm or less as the present level.

Also, if a material which forms a grain boundary region for dividing the magnetic crystal grains is added to the magnetic recording layer in order to downsize the magnetic crystal grains, the alignment of the magnetic crystal grains worsens by diffusion of the material which forms the grain boundary region. To improve the alignment of the magnetic crystal grains, therefore, it is necessary to increase the film thickness of the underlayer or magnetic recording layer. Especially in a double-layered perpendicular magnetic recording medium, this increases the distance between a magnetic recording head and a soft magnetic backing layer for refluxing the head magnetic field, and weakens the effective magnetic field from the magnetic head (produces a spacing loss), thereby worsening the recording/reproduction characteristics of the perpendicular magnetic recording medium. Accordingly, to make the magnetic crystal grains small and uniform, it is necessary to decrease the film thickness of the magnetic recording layer and improve the crystallinity of the magnetic crystal grains.

As a technique of obtaining a fine uniform film in the fields of quantum electronic devices such as single-electron transistors and single-electron memories, a technique which makes a fine uniform nanostructure from Al and Si is disclosed. In this technique, a regular region for preferentially growing Al is formed on a substrate, and a mixed film mainly containing Al and Si and/or Ge is formed after that. The total amount of Si and/or Ge contained in this mixed film is 20 to 70 at %. This makes it possible to form a mixed film having a plurality of cylinders mainly containing Al, having a diameter of 1 to 30 nm, and spaced at intervals of 30 nm or less, and a matrix region mainly containing Si and/or Ge and surrounding these cylinders, e.g., Jpn. Pat. Appln. KOKAI Publication No. 2004-193523. Unfortunately, to form the regular region, this technique requires the formation of micro-recesses of a honeycomb array using a wet process based on the technique of anodic oxidation and focused ion beam (FIB). These wet process and FIB are not easily applicable to the magnetic recording medium manufacturing process which requires a high manufacturing cost and in which film formation is mainly performed in a vacuum. In addition, Si contained in the AlSi film readily diffuses. Therefore, if this AlSi film is directly introduced to the magnetic recording medium, adjacent layers are adversely affected. Furthermore, it is difficult to maintain good crystal alignment by a small film thickness. For these reasons, the above-mentioned nanostructure cannot be directly applied to the field of magnetic recording.

Also, another technique for a perpendicular magnetic recording medium having a soft magnetic backing layer, alignment control layer, grain diameter control layer, underlayer, and perpendicular magnetic recording layer on a substrate is disclosed, e.g., Jpn. Pat. Appln. KOKAI Publication No. 2004-30767. In this technique, the grain diameter control layer mainly contains at least one element selected from the group consisting of silver, aluminum, tantalum, copper, and gadolinium. This makes it possible to control the alignment and grain diameter of magnetic crystal grains of this grain diameter control layer, and increase the thermal decay resistance, thereby increasing the S/N and resolution. However, this technique is still unsatisfactory to achieve a high recording density exceeding, e.g., 100 Gbits/inch$^2$. Accordingly, it is being desired to further downsize and uniformize the magnetic crystal grains.

BRIEF SUMMARY OF THE INVENTION

A perpendicular magnetic recording medium of the present invention is characterized by comprising a nonmagnetic substrate, a first underlayer formed on the nonmagnetic substrate, and containing, as a main component, at least one element selected from the group consisting of Ag, Ir, Ni, Pd, Pt, Rh, Hf, Re, Ru, Ti, Ta, Zr, Mg, and Al, a second underlayer formed on the first underlayer in contact with the first underlayer, and containing crystal grains which contain one of Mg and Al as a main component, and a grain boundary region which contains Si as a main component and surrounds the crystal grains, a third underlayer formed on the second underlayer, and containing, as a main component, at least one element selected from the group consisting of Pt, Pd, Ru, Rh, Co, and Ti, and a perpendicular magnetic recording layer formed on the third underlayer.

Also, a magnetic recording/reproduction apparatus of the present invention is characterized by comprising a perpendicular magnetic recording medium having a nonmagnetic substrate, a first underlayer formed on the nonmagnetic substrate, and containing, as a main component, at least one element selected from the group consisting of Ag, Ir, Ni, Pd, Pt, Rh, Hf, Re, Ru, Ti, Ta, Zr, Mg, and Al, a second underlayer formed on and in contact with the first underlayer, and containing crystal grains which contain one of Mg and Al as a main component, and a grain boundary region which contains Si as a main component and surrounds the crystal grains, a third underlayer formed on the second underlayer, and containing, as a main component, at least one element selected from the group consisting of Pt, Pd, Ru, Rh, Co, and Ti, and a perpendicular magnetic recording layer formed on the third underlayer, and a recording/reproduction head.

In the present invention, a fine magnetic recording layer having a small grain diameter distribution and high crystallinity is formed without increasing the spacing loss, expanding the grain diameter distribution, or degrading the crystallinity. Since, therefore, low noise can be realized by reducing the transition noise of the perpendicular magnetic recording layer without decreasing the thermal decay resistance, and a magnetic recording medium capable of high-density recording is obtained.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present inventors made extensive studies, and have found that it is possible to obtain a perpendicular magnetic recording medium which has fine magnetic crystal grains having a small grain diameter distribution and high crystallinity, produces small transition noise, and can perform high-density recording with a small film thickness, by forming a magnetic recording layer on a nonmagnetic substrate via at least three underlayers, thereby achieving the present invention.

A perpendicular magnetic recording medium of the present invention has an arrangement in which first, second, and third underlayers and a magnetic recording layer are stacked in order on a nonmagnetic substrate.

The first underlayer contains, as a main component, at least one element selected from the group consisting of Ag, Ir, Ni, Pd, Pt, Rh, Hf, Re, Ru, Ti, Ta, Zr, Mg, and Al.

The second underlayer contains crystal grains and a grain boundary region surrounding the crystal grains. The crystal grains contain Mg or Al as a main component. The grain boundary region contains Si as a main component.

The third underlayer contains, as a main component, at least one element selected from the group consisting of Pt, Pd, Ru, Rh, Co, and Ti.

The main component herein mentioned is an element or elements having the highest component ratio of components forming the material.

In the present invention, the alignment of the crystal grains of primarily the second underlayer can be improved by using the first underlayer. Also, the grain diameter and grain diameter distribution of primarily the perpendicular magnetic recording layer can be determined by the crystal grains grown into the shape of a column and the grain boundary region surrounding the crystal grains of the second underlayer. In addition, it is possible, by using the third underlayer, to prevent diffusion of an impurity from the second underlayer, and transmit the grain diameter and alignment of the crystal grains of primarily the second underlayer to the perpendicular magnetic recording layer.

In the present invention, fine uniform magnetic crystal grains having high crystallinity are obtained by forming the perpendicular magnetic recording layer on the third underlayer. Therefore, the transition noise of the perpendicular magnetic recording layer can be reduced without decreasing the thermal decay resistance. Since the noise can be reduced, high-density perpendicular magnetic recording is possible.

The present invention will be described in detail below with reference to the accompanying drawing.

Figure 1:
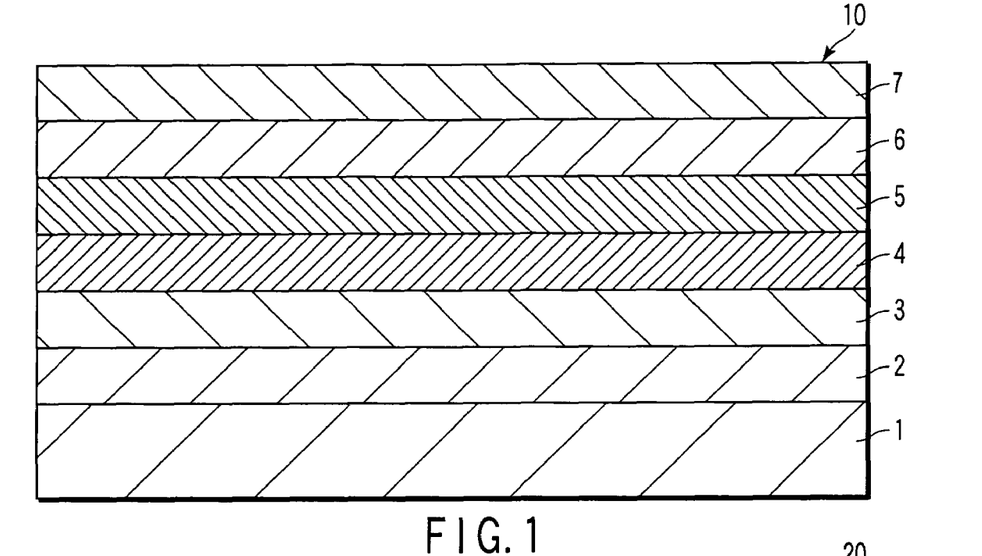
FIG. 1 is a sectional view schematically showing the arrangement of a perpendicular magnetic recording medium according to an embodiment of the present invention.

FIG. 1 is a sectional view schematically showing the arrangement of a perpendicular magnetic recording medium according to an embodiment of the present invention.

Referring to FIG. 1, in a perpendicular magnetic recording medium 10, a soft magnetic backing layer 2, first underlayer 3, second underlayer 4, third underlayer 5, perpendicular magnetic recording layer 6, and protective layer 7 are stacked in order on a nonmagnetic substrate 1. A lubricating layer (not shown) may also be formed on the surface of the protective layer 7 by coating this surface with a lubricant such as perfluoropolyether by dipping or the like.

In the present invention, the soft magnetic backing layer is first formed on the nonmagnetic substrate. Since the soft magnetic backing layer having high permeability is formed, a so-called double-layered perpendicular magnetic recording medium having a perpendicular magnetic recording layer on a soft magnetic backing layer is obtained. In this double-layered perpendicular magnetic recording medium, the soft magnetic backing layer performs a part of the function of a magnetic head, e.g., a single-pole head, which magnetizes the perpendicular magnetic recording layer. That is, the soft magnetic backing layer passes a recording magnetic field from the magnetic head in the horizontal direction, and refluxes the magnetic field to the magnetic head. In this manner, the soft magnetic backing layer can increase the recording/reproduction efficiency by causing the magnetic head to apply a steep and large enough perpendicular magnetic field to the magnetic field recording layer.

Examples of a soft magnetic material used as the soft magnetic backing layer are CoZrNb, CoTaZr, FeCoB, FeCoN, FeTaC, FeTaN, FeNi, and FeAlSi having high saturation flux densities and good soft magnetic characteristics.

Then, a film serving as the first underlayer is formed on the soft magnetic backing layer.

The first underlayer is formed to improve primarily the crystal alignment of the second underlayer. The first underlayer has a function of controlling the crystal alignment of the second underlayer to be formed on the first underlayer, and can improve the perpendicular alignment of the third underlayer and perpendicular magnetic recording layer to be formed on the second underlayer. Normally, the perpendicular alignment of a magnetic recording layer often decreases if the thickness of the underlayer is small. In the present invention, however, the first underlayer makes it possible to improve the perpendicular alignment of the perpendicular magnetic recording medium even if the thickness of the underlayer is relatively small. The material used as the main component of the first underlayer desirably has high alignment even when the film thickness of the material is small. In addition, the material desirably strongly bonds to the crystal grains of the second underlayer formed immediately above the first underlayer.

As a standard for selecting the material forming the first underlayer, heat of formation of alloys ($\Delta H$) is used. In one embodiment of the invention, the heat of formation of alloys ($\Delta H$) of the material as the main component of the first underlayer and the material as the main component of the crystal grains of the second underlayer is −5 kJ/mol or less. In some embodiment of the invention, $\Delta H$ is −50 to −300 kJ/mol. Accordingly, the crystal grains of the first and second underlayers are strongly bonded in their interface. This makes it possible to reduce or eliminate a layer which is generally called an initial layer and contains a large amount of lattice defects found in the initial crystal growth portion. This reduction of the initial layer gives high alignment to the second underlayer having a relatively small film thickness. If $\Delta H$ is larger than −5 kJ/mol, the interface bonding tends to be unsatisfactory, and this may produce an initial layer in the second underlayer, and may make the improvement of the alignment insufficient. If $\Delta H$ is smaller than −300 kJ/mol, the interface bonding tends to be too strong, so the size of the crystal grains in the second underlayer may increase.

When the crystal grains of the second underlayer are made of Al, for example, the material forming the first underlayer is suitably an alloy containing, as a main component, at least one element selected from Ag, Ir, Ni, Pd, Pt, Rh, Hf, Re, Ru, Ti, Ta, Zr, Mg, and Al. In this case, the formation thermal energies of Al and these materials are as follows. Ag (−21 kJ/mol), Hf (−150 kJ/mol), Ir (−113 kJ/mol), Ni (−96 kJ/mol), Pd (−174 kJ/mol), Pt (−164 kJ/mol), Re (−62 kJ/mol), Rh (−124 kJ/mol), Ru (−83 kJ/mol), Ti (−137 kJ/mol), Ta (−75 kJ/mol), Zr (−169 kJ/mol), and Mg (−7 kJ/mol) (A. R. Miedema et al., CALPHAD, vol. 1, No. 4, pp. 341 Pergamon Press, [1977]). In one embodiment of the invention, an alloy containing, as a main component, at least one element selected from Ti, Pd, Pt, Zr, Rh, and Hf is used.

Also, in one embodiment of the invention, the thickness of the first underlayer is 1 to 20 nm. In the other embodiment of the invention, the thickness of the first underlayer is 5 to 10 nm. If the film thickness of the first underlayer is less than 1 nm, the alignment of the first underlayer is unsatisfactory, so the alignment of the second underlayer often worsens. If the film thickness is larger than 20 nm, the distance from the magnetic head to the soft magnetic backing layer increases, and the spacing loss often deteriorates the recording/reproduction characteristics of the magnetic recording medium. The use of a film having soft magnetic characteristics as the first underlayer has the advantage that no spacing loss is produced.

Then, the second underlayer is formed immediately above the first underlayer in order to control the grain diameter. The second underlayer is made of two or more types of materials, and contains crystal grains having a face-centered cubic structure or hexagonal closest packed structure, and a grain boundary region surrounding these grains. The second underlayer desirably has a small grain diameter or a small grain diameter distribution. The second underlayer also desirably has a relatively small film thickness and high crystallinity. To this end, the second underlayer favorably strongly bonds to the material contained as a main component in the first underlayer. In the present invention, therefore, it is possible to use at least one element selected from Mg and Al as the main component of the crystal grains, and use Si as the grain boundary region surrounding the grains. Since these materials form almost no solid solution with each other, the crystal grains and the grain boundary region can be separated relatively easily.

In one embodiment of the invention, the array of the crystal grains in the longitudinal direction of the film has two-dimensional regularity. For example, the array of the crystal grains in a section in the longitudinal direction of the film has the regularity of hexagonal symmetry.

Also, the material forming the grain boundary region is desirably a material which forms substantially no solid solution with the material as the main component of the crystal grains. Si can be used as the main component of this material. In addition, it is also possible to use one or more types of compounds such as oxides, nitrides, carbides, and borides of, e.g., Si, Ti, Al, and Mg.

In one embodiment of the invention, the content of the material forming the grain boundary region is 20 to 80 at % with respect to the total composition of the second underlayer. If the content is smaller than 20 at %, separation between the grains by the grain boundary is often insufficient. If the content is larger than 80 at %, the crystal alignment of the second underlayer often deteriorates. Also, in one embodiment of the invention, the thickness of the second underlayer is 0.1 to 20 nm. In one embodiment of the invention, the thickness of the second underlayer is 1 to 10 nm. If the thickness is smaller than 0.1 nm, it is often difficult to well cover the entire film. If the thickness is larger than 20 nm, the distance between the magnetic head and soft magnetic backing layer increases, and a so-called spacing loss often deteriorates the recording/reproduction characteristics as the magnetic recording medium.

Furthermore, as the second underlayer, it is also possible to use a multilayered structure in which two or more layers are stacked. These layers have the same combination of two or more types of materials forming the crystal grains and grain boundary region, but have different composition ratios. In this case, the second underlayer is formed by a layer in contact with the first underlayer, and a layer in contact with the third underlayer. In one embodiment of the invention, the content of Si forming the grain boundary region is smaller in the layer in contact with the first underlayer than in the layer in contact with the third underlayer. In the second underlayer, the alignment of the crystal grains often worsens by the influence of the material forming the grain boundary region. The first layer formed on the first underlayer is equivalent to the initial layer in the second underlayer. If the content of the material forming the crystal grains is large in this layer, the alignment of the whole second underlayer can improve. In one embodiment of the invention, the thickness of the first layer formed on the first underlayer is 0.1 to 2 nm. If the thickness is smaller than 0.1 nm, the alignment is often difficult to improve. If the thickness is larger than 2 nm, the size of the crystal grains often increases.

In the second underlayer, the Si content in the first layer is preferably 5 to 30 at %, and more preferably, 10 to 15 at %.

If the Si content in the first layer is larger than 30 at %, the difference from the Si content in the layer in contact with the third underlayer decreases, so the alignment is often difficult to improve. If the Si content is smaller than 5 at %, the size of the crystal grains often increases. Also, in one embodiment of the invention, the Si content in the second layer is 30 to 80 at %. If the Si content is larger than 80 at %, the crystal alignment tends to deteriorate. If the Si content is smaller than 30 at %, the difference from the Si content in the first layer tends to decrease, so the alignment may be difficult to improve.

The crystal grains of the perpendicular magnetic recording layer can be made uniform and small by making the crystal grain diameters in the second underlayer uniform and small.

The third underlayer is formed on the obtained second underlayer.

The third underlayer has a function of transmitting the grain diameter and alignment of the second underlayer to the magnetic recording layer. The third underlayer also has a function of preventing diffusion of an impurity from the second underlayer. It is important that the third underlayer have a crystal face by which the magnetic recording layer can epitaxially grow.

As a material like this, a closest packed face such as a face-centered cubic lattice or hexagonal closest packed structure desirably appears on the underlayer surface. The material forming the third underlayer preferably contains at least one of Pt, Pd, Ru, Rh, Co, and Ti. These metals have the advantage that the crystallinity is high even with a small film thickness. As an alloy having this advantage, it is possible to use, e.g., RuCr, alloys containing Rh, Re, and Hf, CoCr, CoCrPt, and CoCrPtB. These materials have the advantage that the magnetic recording layer easily grows epitaxially on them.

The third underlayer may also be given a granular structure by adding an oxide, nitride, and carbide to the above metal material. That is, when crystal grains made of the above metal are surrounded by a grain boundary region made of an oxide, nitride, and carbide, the grain boundary structure becomes distinct, and division of grains in the magnetic recording layer formed on the third underlayer can be accelerated.

The perpendicular magnetic recording layer is epitaxially grown on the third underlayer. In this manner, the fine uniform crystal grain diameter structure obtained in these underlayers can be introduced to the perpendicular magnetic recording layer.

The perpendicular magnetic recording layer used in the present invention can contain Co and Pt as its main components. This perpendicular magnetic recording layer may also be formed by stacking two or more magnetic recording layers having different compositions. In addition, heating and cooling processes may also be performed before and after film formation.

As the material forming the perpendicular magnetic recording layer, it is possible to use, e.g., a CoPt alloy, CoCr alloy, CoCrPt alloy, CoCrPtB alloy, CoCrPtTa alloy, CoCrPt—$SiO_2$ alloy, CoCrPtO alloy, and CoCrPt—$TiO_2$ alloy. In one embodiment of the invention, a CoCrPt—$SiO_2$ alloy, CoCrPtO alloy, and CoCrPt—$TiO_2$ alloy can be used. These alloys have the advantages that the crystal alignment is high, the magnetic anisotropy is large, and the thermal decay resistance is high. A magnetic recording layer containing oxygen has a distinct grain boundary region, and can better divide the magnetic interaction.

At least one protective film can be formed on the perpendicular magnetic recording layer. Examples of this protective film are C, diamond-like carbon (DLC), $SiN_x$, $SiO_x$, $CN_x$, and $CH_x$.

The soft magnetic backing layer, first, second, and third underlayers, perpendicular magnetic recording layer, and protective film can be formed by various film formation techniques, such as sputtering, normally used in the field of magnetic recording media. For example, it is possible to use DC magnetron sputtering, RF magnetron sputtering, and vacuum evaporation.

Also, when two or more types of materials are to be mixed, it is possible to use single-target sputtering using a composite target or simultaneous multi-target sputtering using targets of the individual materials.

A lubricating layer can be formed on the surface of the perpendicular magnetic recording medium, e.g., the surface of the magnetic recording layer or the surface of the protective layer, by coating the surface with a lubricant such as perfluoroether by dipping, spin coating, or the like.

Figure 2:
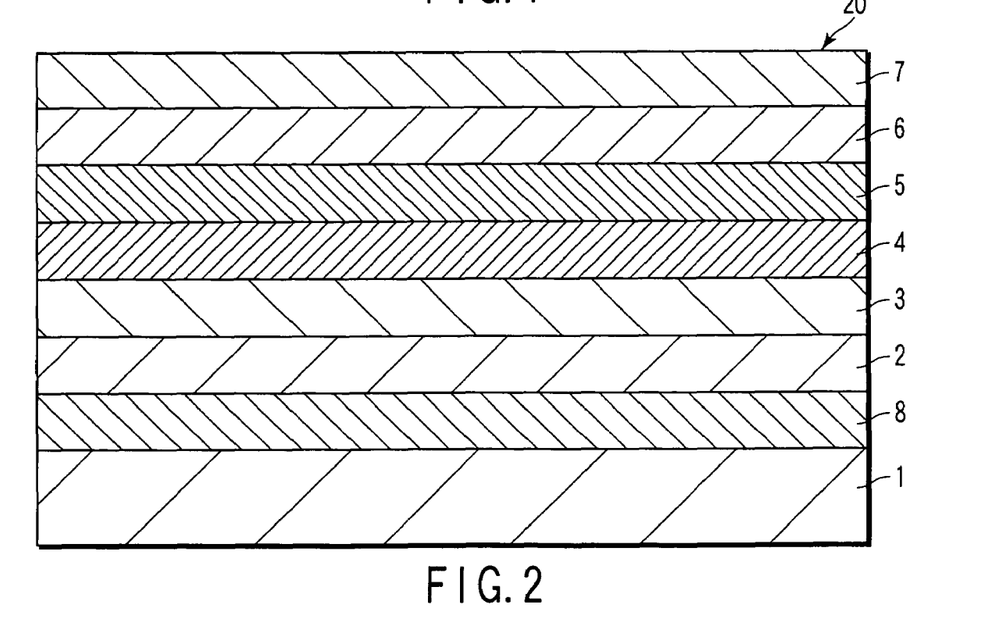
FIG. 2 is a sectional view schematically showing the arrangement of a perpendicular magnetic recording medium according to an embodiment of the present invention.

FIG. 2 is a sectional view schematically showing the arrangement of a perpendicular magnetic recording medium according to an embodiment of the present invention.

A perpendicular magnetic recording medium 20 shown in FIG. 2 has the same arrangement as shown in FIG. 1 except that a bias application layer 8 such as a longitudinal hard magnetic film or antiferromagnetic layer is formed between a soft magnetic backing layer 2 and nonmagnetic substrate 1.

The soft magnetic backing layer 2 readily forms a magnetic domain, and spike noise is produced from this magnetic domain. The formation of the domain wall can be prevented by applying a bias magnetic field to the soft magnetic backing layer 2 formed on the bias application layer 8 by applying a magnetic field in one direction along the radial direction of the bias application layer 8. It is also possible to prevent easy formation of large magnetic domains by finely dispersing anisotropy by giving the bias application layer 8 a stacked structure.

Examples of the bias application layer material used in the bias application layer 8 are CoCrPt, CoCrPtB, CoCrPtTa, CoCrPtC, CoCrPtCuB, CoCrRuB, CoCrPtWC, CoCrPtWB, CoCrPtTaNd, CoSm, CoPt, CoPtO, CoCrPtO, CoPt—$SiO_2$, and CoCrPtO—$SiO_2$.

The bias application layer can be formed by a film formation method such as sputtering.

As the nonmagnetic substrate used in the present invention, it is possible to use, e.g., aluminosilicate glass, chemical reinforced glass, an Al-based alloy substrate such as an AlMg substrate, and nonmagnetic substrates having higher heat-resistant temperatures such as a crystallized glass substrate, Si substrate, C substrate, Ti substrate, surface-oxidized Si substrate, ceramics, and plastic. The same effect can be expected even when the surface of any of these nonmagnetic substrates is plated with an NiP alloy or the like.

Figure 3:
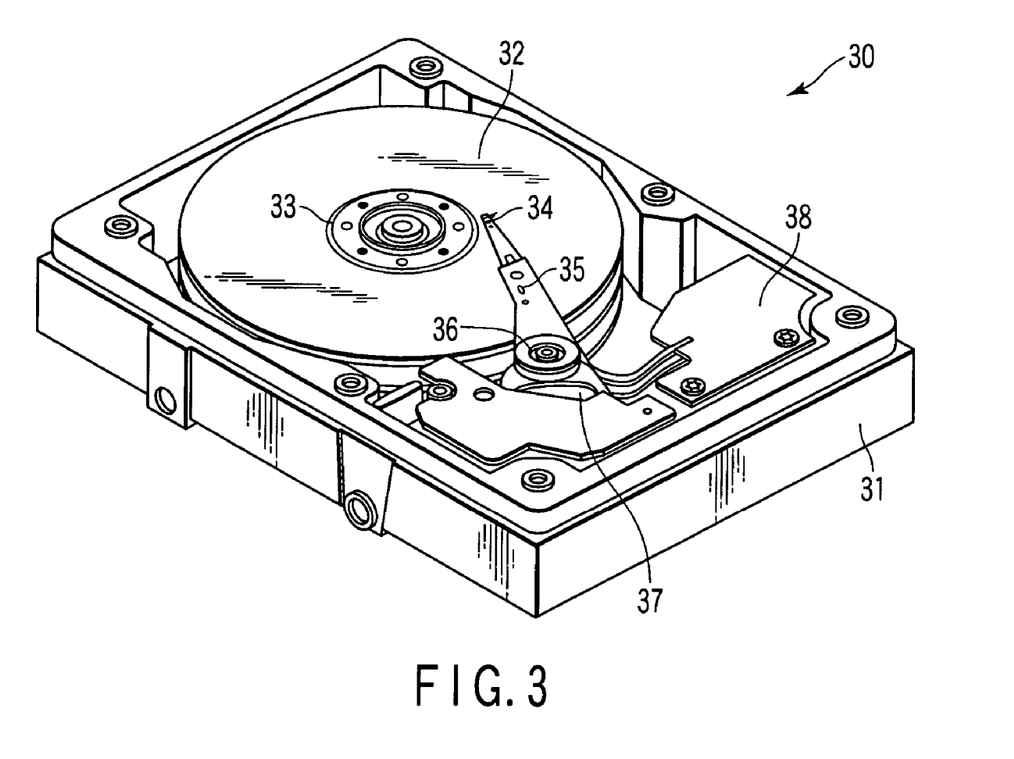
FIG. 3 is a partially exploded perspective view showing an example of a magnetic recording/reproduction apparatus of the present invention.

FIG. 3 is a partially exploded perspective view showing an example of a magnetic recording/reproduction apparatus of the present invention.

As shown in FIG. 3, a perpendicular magnetic recording apparatus 30 of the present invention has a rectangular box housing 31 having an open upper end, and a top cover (not shown) which is screwed to the housing 31 by a plurality of screws to close the open upper end of the housing.

The housing 31 houses a perpendicular magnetic recording medium 32 according to the present invention, a spindle motor 33 as a driving means for supporting and rotating the perpendicular magnetic recording medium 32, a magnetic head 34 which records and reproduces magnetic signals with respect to the magnetic recording medium 32, a head actuator 35 which has a suspension having a distal end on which the magnetic head 32 is mounted, and supports the magnetic head 34 so that it can freely move with respect to the perpendicular magnetic recording medium 32, a rotating shaft 36 which rotatably supports the head actuator 35, a voice coil motor 37 which rotates and positions the head actuator 35 via the rotating shaft 36, and a head amplifier circuit 38.

The present invention will be described in more detail below by way of its examples.

EXAMPLE 1

A nonmagnetic substrate made of a glass substrate for a 2.5-inch magnetic disk was prepared.

This nonmagnetic substrate was placed in a vacuum chamber having a vacuum degree of $1 \times 10^{-5}$ Pa. The substrate temperature was increased to 250° C., and DC magnetron sputtering was performed in an Ar ambient at a gas pressure of 0.6 Pa.

First, the nonmagnetic substrate was opposed to a target, and DC 500 W were discharged to the target to form a 40-nm thick Cr layer as a backing nonmagnetic layer.

On this Cr layer, a 25-nm thick CoCrPt ferromagnetic layer was formed as a bias application layer.

On the obtained CoCrPt ferromagnetic layer, a 150-nm thick CoZrNb soft magnetic backing layer was formed.

After that, the temperature was decreased to room temperature, and 500 W were discharged to a Ti target to form a 10-nm thick Ti first underlayer on the CoZrNb soft magnetic backing layer.

Then, DC 500 W were discharged to an Al—Si composite target to form, on the first underlayer, a 10-nm thick AlSi layer having a composition ratio of Al-45 at % Si in the film as a second underlayer.

The composition in the film can be checked by, e.g., an energy dispersive X-ray spectral analyzer using a transmission electron microscope (TEM-EDX), inductively coupled plasma-atomic emission spectroscopy (ICP-AES), or mass spectrometry (ICP-MS).

An Ru target was then used to form a 15-nm thick Ru third underlayer on the second underlayer.

In addition, a composite target of (Co-16 at % Pt-10 at % Cr)-8 mol % $SiO_2$ was prepared to form a 15-nm thick CoPtCr—$SiO_2$ perpendicular magnetic recording layer on the Ru third underlayer.

Finally, a 7-nm thick C protective film was formed.

After the substrate on which the films were continuously formed in the vacuum chamber as described above was taken out into the atmosphere, a 1.5-nm thick perfluoropolyether-based lubricating film was formed by dipping, thereby obtaining a perpendicular magnetic recording medium.

Figure 4:
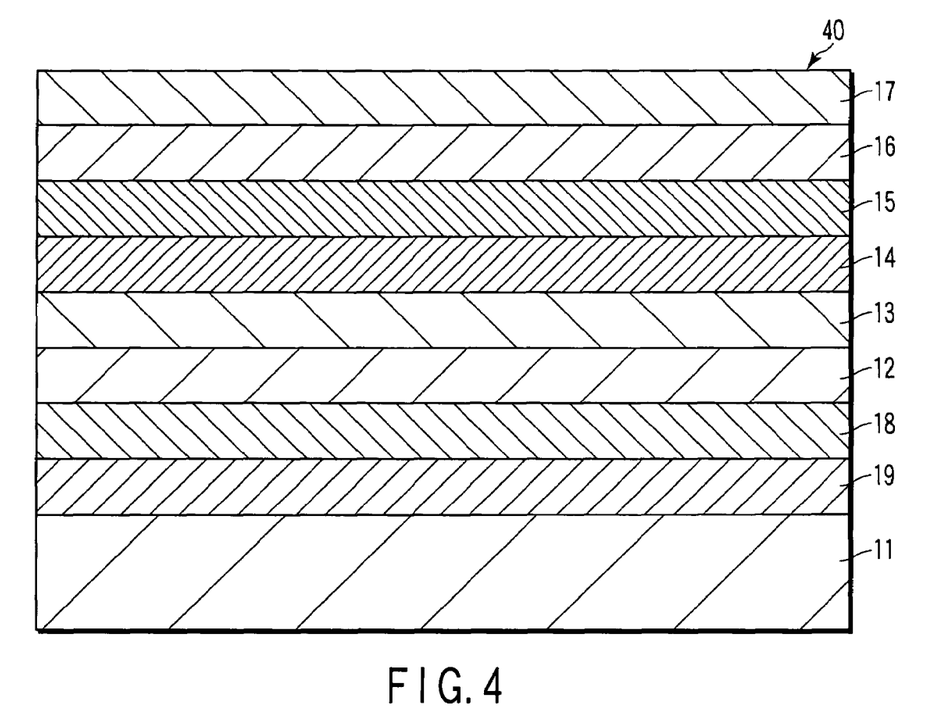
FIG. 4 is a sectional view schematically showing the arrangement of a perpendicular magnetic recording medium according to an embodiment of the present invention.

FIG. 4 is a schematic sectional view showing the arrangement of the obtained perpendicular magnetic recording medium.

As shown in FIG. 4, a perpendicular magnetic recording medium 40 has a structure in which a Cr nonmagnetic layer 19, CoCrPt ferromagnetic layer 18, CoZrNb soft magnetic backing layer 12, Ti first underlayer 13, Al—Si second underlayer 14, Ru third underlayer 15, CoPtCr—$SiO_2$ perpendicular magnetic recording layer 16, C protective film 17, lubricating layer (not shown) are sequentially stacked on a nonmagnetic substrate 1.

First, measurements were performed on the perpendicular magnetic recording layer of the obtained perpendicular magnetic recording medium by using a transmission electron microscope (TEM), thereby checking the grain diameter distributions of crystal grains in the second and third underlayers and in the perpendicular magnetic recording layer. The grain diameter distribution in each layer was evaluated by the following procedure.

First, from planar TEM images at magnifications of ×500,000 to ×2,000,000, an arbitrary image containing at least 100 grains was loaded as image information into a computer. This image information was processed to extract the contours of the individual crystal grains, thereby checking the number of pixels in a portion surrounded by each contour. The number of pixels was converted into an area by dividing it by the number of pixels per unit area, thereby obtaining an area occupied by each crystal grain. Then, a diameter when each crystal grain was regarded as a circle was calculated as a crystal grain diameter from the area of the crystal grain, and the average value and standard deviation of the crystal grain diameters were calculated. Also, a grain boundary region having a thickness of about 1 to 2 nm was observed between the crystal grains. The average inter-grain distance of the crystal grains was calculated by taking this grain boundary region thickness into consideration.

Consequently, each of the second and third underlayers and the perpendicular magnetic recording layer was formed by crystal grains having an average grain diameter of about 4 nm, and the standard deviation of the grain diameter distribution was 0.5 nm or less. The difference between the average inter-grain distances of the crystal grains in the second and third underlayers was ±10% or less.

Then, a planar TEM image loaded into the computer in the same manner as above was processed to perform two-dimensional fast Fourier transformation, thereby evaluating the periodicity of the grain array in the second and third underlayers and the perpendicular magnetic recording layer. An untransformed real space image of each of the second and third underlayers and the perpendicular magnetic recording layer obviously had the regularity of hexagonal symmetry. In addition, four distinct peaks were observed in a transformed spectral image. This demonstrates that the grain array has two-dimensional regularity, and, from the arrangement of the peaks, the grain array has hexagonal symmetry.

Also, a local element concentration distribution in the second underlayer was checked by TEM-EDX. Consequently, it was possible to confirm a structure including crystal grains mainly containing Al and a grain boundary region mainly containing Si and surrounding each crystal grain.

When X-ray diffraction measurement was performed on the second underlayer, an Al (111) peak was observed. When locking curve measurement was performed on this Al (111) peak, the half-width of the peak was 7°. In addition, when X-ray diffraction measurement was performed on the perpendicular magnetic recording layer, a CoCrPt—$SiO_2$ (00.2) peak was observed. When locking curve measurement was performed on this CoCrPt—$SiO_2$ (00.2) peak, the half-width of the peak was 5°, indicating that the perpendicular magnetic recording layer had high crystallinity.

A magnetic field of 1,185 A/m (15,000 Oe) was applied outward in the radial direction of the circular substrate of the obtained perpendicular magnetic recording medium by using a magnetizing device having an electromagnet, thereby magnetizing the ferromagnetic layer of the bias application layer in the longitudinal radial direction.

The recording/reproduction characteristics of the magnetized perpendicular magnetic recording medium were evaluated by using Read-Write Analyzer 1632 and Spinstand S1701MP manufactured by GUZIK Technical Enterprises of the U.S.A. As a recoding/reproduction head, a head using a single magnetic pole as a recording portion and the magnetoresistance effect as a reproduction element and having a recording track width of 0.25 μm and a reproduction track width of 0.15 μm was used. Also, the measurement was performed at a disk rotational speed of 4,200 rpm in a fixed position 22.2 mm from the center in the radial direction.

Consequently, the medium had a high SNRm (reproduction signal output S: output at a linear recording density of 119 kFCI, Nm: value of rms [root mean square] at 716 kFCI) of 27.5 dB. In addition, the attenuation value at a low-frequency output of 50 kFCI as an index of the thermal decay resistance was as high as −0.005 dB/decade.

COMPARATIVE EXAMPLE 1

As a comparative perpendicular magnetic recording medium, a perpendicular magnetic recording medium was obtained following the same procedures as for the perpendicular magnetic recording medium of Example 1 except that no first underlayer was formed.

The obtained perpendicular magnetic recording medium has the same arrangement as the perpendicular magnetic recording medium shown in FIG. 4 except that no first underlayer is formed.

X-ray diffraction measurement was performed on the second underlayer, but no Al (111) peak was observed.

When X-ray diffraction measurement was performed on the perpendicular magnetic recording layer, a CoCrPt—SiO$_2$ (00.2) peak was observed. When locking curve measurement was performed on this CoCrPt—SiO$_2$ (00.2) peak, the half-width of the peak was 15°.

Also, TEM measurements were performed on the second and third underlayers and the perpendicular magnetic recording layer of the obtained perpendicular magnetic recording medium, thereby checking the grain diameter distributions of the crystal grains. Consequently, the second and third underlayers and the perpendicular magnetic recording layer had grain diameter distributions of 10 to 30 nm.

When the recording/reproduction characteristics were evaluated in the same manner as in Example 1, the SNRm was 12.8 dB. Furthermore, the attenuation value at a low-frequency output of 50 kFCL was −0.25 dB/decade.

Accordingly, the crystal grains of the second and third underlayers and the perpendicular magnetic recording layer were finer, the grain diameters were more uniform, and the crystallinity were higher in the medium of the present invention of Example 1 in which the Ti first underlayer was formed than in the conventional medium of Comparative Example 1 in which no first underlayer was formed. In addition, the recording/reproduction characteristics of the medium of the present invention of Example 1 were superior to those of the conventional medium of Comparative Example 1.

COMPARATIVE EXAMPLE 2

As a comparative perpendicular magnetic recording medium, a perpendicular magnetic recording medium was obtained following the same procedures as for the perpendicular magnetic recording medium of Example 1 except that an Al target was used to form a 10-nm thick Al layer as the second underlayer.

The obtained perpendicular magnetic recording medium has the same arrangement as the perpendicular magnetic recording medium shown in FIG. 4 except for the second underlayer.

When X-ray diffraction measurement was performed on the perpendicular magnetic recording layer, a CoCrPt—SiO$_2$ (00.2) peak was observed. When locking curve measurement was performed on this CoCrPt—SiO$_2$ (00.2) peak, the half-width of the peak was 12°.

Also, TEM measurements were performed on the second and third underlayers and the perpendicular magnetic recording layer of the obtained perpendicular magnetic recording medium, thereby checking the grain diameter distributions of the crystal grains. Consequently, the second and third underlayers and the perpendicular magnetic recording layer had grain diameter distributions of 15 to 30 nm.

When the recording/reproduction characteristics were evaluated in the same manner as in Example 1, the SNRm was 11.8 dB. Furthermore, the attenuation value at a low-frequency output of 50 kFCL was −0.15 dB/decade.

Accordingly, the crystal grains of the second and third underlayers and the perpendicular magnetic recording layer were finer, the grain diameters were more uniform, and the crystallinity was higher in the medium of the present invention of Example 1 in which Al—Si was used as the second underlayer than in the conventional medium of Comparative Example 2 in which Al was used as the second underlayer. In addition, the recording/reproduction characteristics of the medium of the present invention of Example 1 were superior to those of the conventional medium of Comparative Example 2.

EXAMPLE 2

Al-x at % Si targets (0 at % $\leq$ x $\leq$ 90 at %) having various composition ratios were prepared as second underlayers.

Perpendicular magnetic recording media were manufactured following the same procedures as in Example 1 except that the Al-x at % Si composite targets having various composition ratios were used instead of the Al—Si composite target, thereby variously changing the composition ratio.

The obtained perpendicular magnetic recording media have the same arrangement as the perpendicular magnetic recording medium shown in FIG. 4 except for the second underlayers.

Grain diameter measurements and recording/reproduction characteristic evaluations were performed on the second and third underlayers and the perpendicular magnetic recording layers of the obtained various perpendicular magnetic recording media following the same procedures as in Example 1.

Consequently, the second and third underlayers and the perpendicular magnetic recording layers had grain diameter distributions of 4 to 10 nm. Also, the standard deviations of the grain diameter distributions were 0.5 to 1.5 nm, indicating good results. Furthermore, planar TEM images loaded into a computer in the same manner as in Example 1 were processed to perform two-dimensional fast Fourier transformation, thereby evaluating the periodicity of the grain array in the second and third underlayers and the perpendicular magnetic recording layers. As a consequence, four distinct peaks were observed. This demonstrates that the grain array has two-dimensional regularity, and, from the arrangement of the peaks, this grain array has hexagonal symmetry. In addition, local element concentration distributions in the second underlayers were checked by using TEM-EDX. Consequently, it was possible to confirm a structure including crystal grains mainly containing Al and a grain boundary region mainly containing Si and surrounding each crystal grain.

Figure 5:
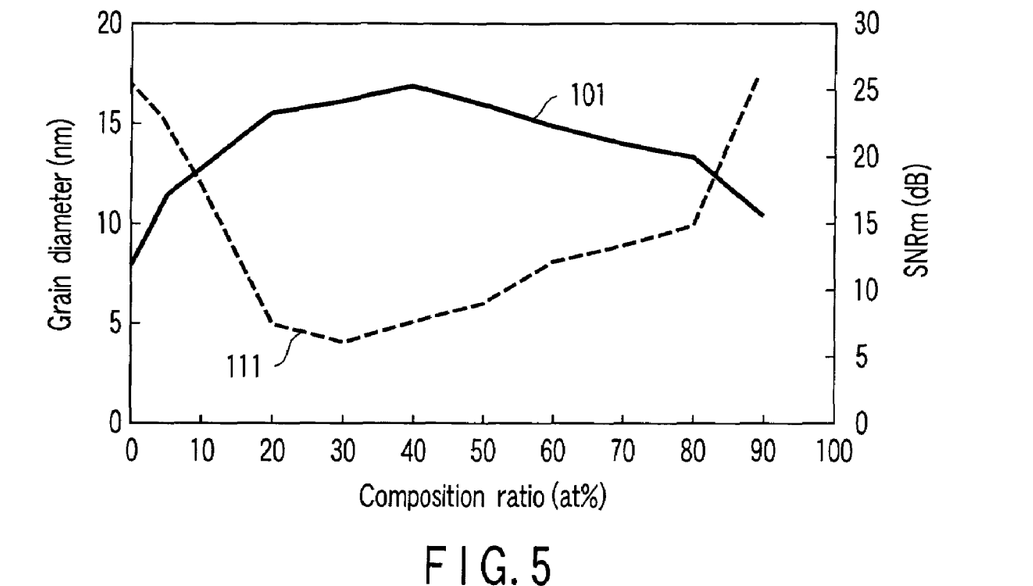
FIG. 5 is a graph showing the SNRm and crystal grain diameter as functions of the Si composition ratio in an AlSi second underlayer.

FIG. 5 is a graph showing the relationship between the Si composition ratio and SNRm and the relationship between the Si composition ratio and crystal grain diameter, in the Al-x at % Si second underlayers.

A curve 101 represents the SNRm when the Si composition ratio was $\underline{x}$ at % ($0 \leq x \leq 90$). A curve 111 represents the average grain diameter when the Si composition ratio was $\underline{x}$ at % ($0 \leq x \leq 90$).

As shown in FIG. 5, when the composition ratio of Si forming the grain boundary region of the second underlayer was 20 to 80 at %, the average grain diameter of the second underlayer was small, and as a consequence the SNRm was high.

Also, the attenuation values at a low-frequency output of 50 kFCI were as high as −0.005 to −0.05 dB/decade.

EXAMPLE 3

Mg-x at % Si targets (0 at % $\leq x \leq$ 90 at %) having various composition ratios were prepared.

Perpendicular magnetic recording media were manufactured following the same procedures as in Example 1 except that the Mg-x at % Si composite targets having various composition ratios were used instead of the Mg—Si composite target, thereby variously changing the composition ratio of the second underlayer.

The obtained perpendicular magnetic recording media have the same arrangement as the perpendicular magnetic recording medium shown in FIG. 4 except for the materials and composition ratios of the second underlayers.

Grain diameter measurements and recording/reproduction characteristic evaluations were performed on the second and third underlayers and the perpendicular magnetic recording layers of the obtained various perpendicular magnetic recording media following the same procedures as in Example 1. Consequently, the second and third underlayers and the perpendicular magnetic recording layers had grain diameter distributions of 4 to 10 nm. Also, the standard deviations of the grain diameter distributions were 0.5 to 2.0 nm, indicating good results. Furthermore, planar TEM images loaded into a computer in the same manner as in Example 1 were processed to perform two-dimensional fast Fourier transformation, thereby evaluating the periodicity of the grain array in the second and third underlayers and the perpendicular magnetic recording layers. As a consequence, four distinct peaks were observed. This demonstrates that the grain array has two-dimensional regularity, and, from the arrangement of the peaks, this grain array has hexagonal symmetry.

In addition, local element concentration distributions in the second underlayers were checked by using TEM-EDX. Consequently, it was possible to confirm a structure including crystal grains mainly containing Mg and a grain boundary region mainly containing Si and surrounding each crystal grain.

When X-ray diffraction measurement was performed on each second underlayer, an Mg (00.2) peak was observed. When locking curve measurement was performed on this Mg (00.2) peak, the half-width of the peak was 8°.

Also, when X-ray diffraction measurement was performed on each perpendicular magnetic recording layer, a CoCrPt—SiO$_2$ (00.2) peak was observed. When locking curve measurement was performed on this CoCrPt—SiO$_2$ (00.2) peak, the half-width of the peak was 5°.

Figure 6:
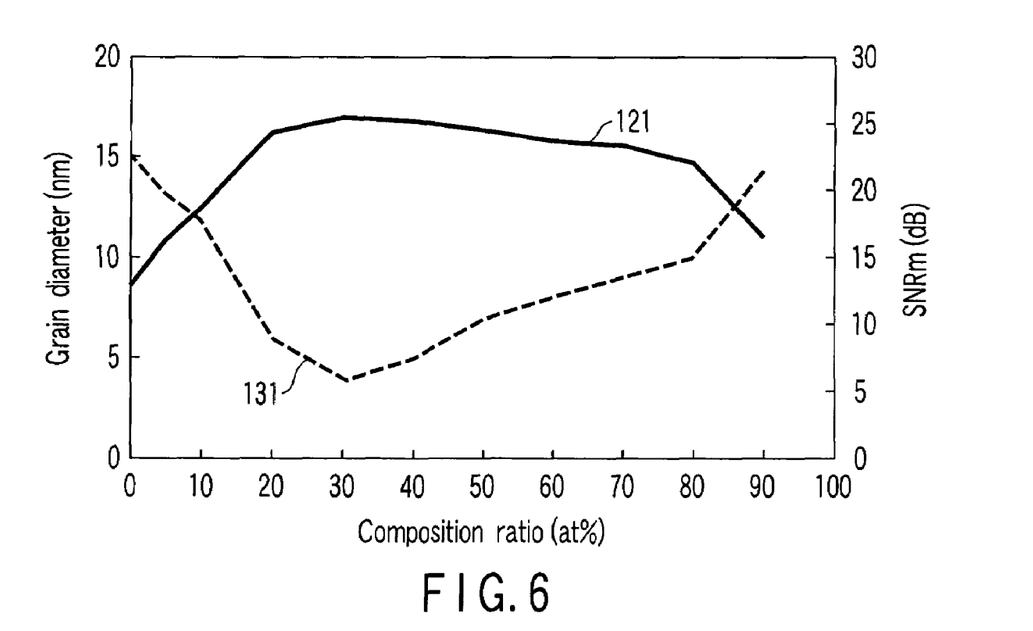
FIG. 6 is a graph showing the SNRm and crystal grain diameter as functions of the Si composition ratio in an MgSi second underlayer.

FIG. 6 is a graph showing the relationship between the Si composition ratio and SNRm and the relationship between the Si composition ratio and crystal grain diameter, in the Mg-x at % Si second underlayers.

A curve 121 represents the SNRm when the Si composition ratio was $\underline{x}$ at % ($0 \leq x \leq 90$). A curve 131 represents the average grain diameter when the Si composition ratio was $\underline{x}$ at % ($0 \leq x \leq 90$).

As shown in FIG. 6, when the composition ratio of Si forming the grain boundary region of the second underlayer was 20 to 80 at %, the average grain diameter of the second underlayer was small, and as a consequence the SNRm was high. Furthermore, the attenuation values at a low-frequency output of 50 kFCI were as high as −0.006 to −0.04 dB/decade.

EXAMPLE 4

Al—Si composite target was prepared as a second underlayer. Perpendicular magnetic recording media were manufactured following the same procedures as in Example 1 except that the Al—Si composite target was used, the composition ratio in the film was Al-45 at % Si, and the film thickness was variously changed.

The obtained perpendicular magnetic recording media have the same arrangement as the perpendicular magnetic recording medium shown in FIG. 4 except for the film thicknesses of the second underlayers.

Grain diameter measurements and recording/reproduction characteristic evaluations were performed on the second and third underlayers and the perpendicular magnetic recording layers of the obtained various perpendicular magnetic recording media following the same procedures as in Example 1. Consequently, the second and third underlayers and the perpendicular magnetic recording layers had grain diameter distributions of 5 to 10 nm. Also, the standard deviations of the grain diameter distributions were 0.5 to 1 nm, indicating good results. Furthermore, planar TEM images loaded into a computer in the same manner as in Example 1 were processed to perform two-dimensional fast Fourier transformation, thereby evaluating the periodicity of the grain array in the second and third underlayers and the perpendicular magnetic recording layers. As a consequence, four distinct peaks were observed. This demonstrates that the grain array has two-dimensional regularity, and, from the arrangement of the peaks, this grain array has hexagonal symmetry. In addition, local element concentration distributions in the second underlayers were checked by using TEM-EDX. Consequently, it was possible to confirm a structure including crystal grains mainly containing Al and a grain boundary region mainly containing Si and surrounding each crystal grain.

Figure 7:
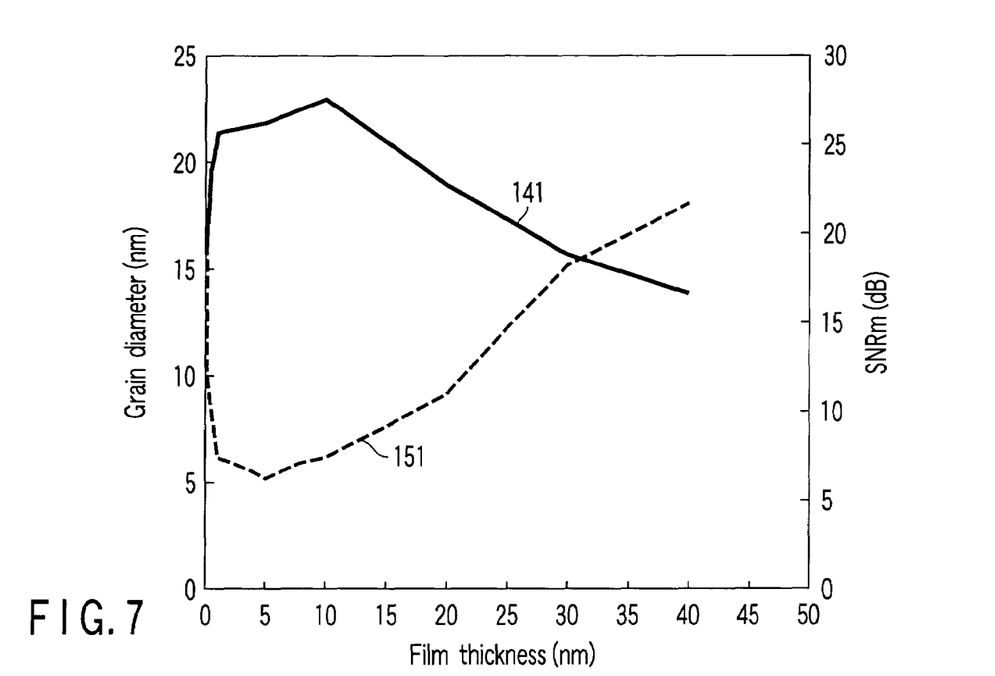
FIG. 7 is a graph showing the SNRm and average crystal grain diameter as functions of the film thickness of an AlSi second underlayer.
Figure 8:
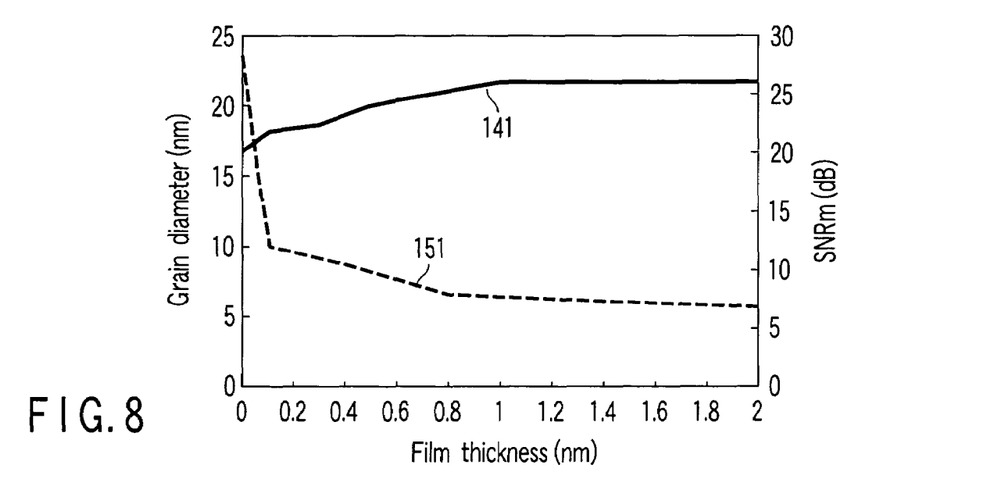
FIG. 8 is a graph showing the SNRm and average crystal grain diameter as functions of the film thickness of the AlSi second underlayer.

FIGS. 7 and 8 are graphs each showing the relationship between the film thickness and SNRm and the relationship between the film thickness and average crystal grain diameter, in the Al—Si second underlayers.

FIG. 7 is a graph when the film thickness was changed from 0 to 50 nm. FIG. 8 is a graph showing the film thickness range of 0 to 2 nm in FIG. 7 in more detail.

In each of FIGS. 7 and 8, a curve 141 represents the SNRm when the film thickness was $\underline{x}$ nm ($0 \leq x \leq 30$). A curve 151 represents the average crystal grain diameter when the film thickness was $\underline{x}$ nm ($0 \leq x \leq 30$).

As shown in FIGS. 7 and 8, when the film thickness of the second underlayer was 0.1 to 20 nm, the average crystal grain diameter of the second underlayer was small, and as a consequence the SNRm was high. The film thickness of the second underlayer was more favorably 1 to 10 nm. Also, the attenuation values at a low-frequency output of 50 kFCI were as high as −0.005 to −0.01 dB/decade.

EXAMPLE 5

A Pd target was prepared as a first underlayer. A perpendicular magnetic recording medium was manufactured following the same procedures as in Example 1 except that this Pd target was used instead of the Ti target.

The obtained perpendicular magnetic recording medium has the same arrangement as the perpendicular magnetic recording medium shown in FIG. 4 except for the first underlayer.

TEM observation and image processing were performed on the second and third underlayers and the perpendicular magnetic recording layer of the obtained perpendicular magnetic recording medium, thereby checking the grain diameter distribution of crystal grains in each layer. Consequently, the second and third underlayers and the perpendicular magnetic recording layer were made of crystal grains having grain diameters of 5 to 7 nm, and the standard deviation of the grain diameter distribution was 0.9 nm or less. Also, a grain boundary region having a thickness of about 1 to 2 nm was observed between the crystal grains. In addition, a planar TEM image loaded into a computer in the same manner as in Example 1 was processed to perform two-dimensional fast Fourier transformation, thereby evaluating the periodicity of the grain array in the second and third underlayers and the perpendicular magnetic recording layer. As a consequence, four distinct peaks were observed. This demonstrates that the grain array has two-dimensional regularity, and, from the arrangement of the peaks, this grain array has hexagonal symmetry.

Then, a local element concentration distribution in the second underlayer was checked by using TEM-EDX. Consequently, it was possible to confirm a structure including crystal grains mainly containing Al and a grain boundary region mainly containing Si and surrounding each crystal grain. When X-ray diffraction measurement was performed on the second underlayer, an Al (111) peak was observed. When locking curve measurement was performed on this Al (111) peak, the half-width of the peak was 7°.

Also, when X-ray diffraction measurement was performed on the perpendicular magnetic recording layer, a CoCrPt—$SiO_2$ (00.2) peak was observed. When locking curve measurement was performed on this CoCrPt—$SiO_2$ (00.2) peak, the half-width of the peak was 5°, i.e., the crystallinity was high.

When the recording/reproduction characteristics were evaluated in the same manner as in Example 1, the SNRm was 27.4 dB. Furthermore, the attenuation value at a low-frequency output of 50 kFCI was as high as −0.007 dB/decade.

Similarly, Ag, Ir, Ni, Pt, Rh, Hf, Re, Ru, Ta, Zr, Mg, and Al targets were prepared as first underlayers, and various perpendicular magnetic recording media were manufactured following the same procedures as in Example 1 except that these various targets were used instead of the Pd target.

Grain diameter observation of the second underlayer by TEM and recording/reproduction characteristic evaluation were performed on each obtained perpendicular magnetic recording medium in the same manner as in Example 1. The results are shown in Table 1 below.

TABLE 1

| First underlayer | Average grain diameter (nm) | SNRm (dB) |
|---|---|---|
| Ag | 9 | 23.5 |
| Ir | 9 | 23.3 |
| Ni | 7 | 24.0 |
| Re | 7 | 23.1 |
| Ru | 8 | 22.7 |
| Ta | 8 | 24.2 |
| Pd | 5 | 27.4 |
| Pt | 6 | 27.0 |
| Rh | 6 | 25.2 |
| Hf | 5 | 25.0 |
| Ti | 5 | 25.4 |
| Zr | 7 | 25.1 |
| Mg | 7 | 23.8 |
| Al | 5 | 23.4 |

Table 1 shows that when at least one element selected from Ag, Ir, Ni, Pt, Pd, Rh, Hf, Re, Ru, Ta, Zr, Mg, and Al was used as the material forming the first underlayer, the average grain diameter of the obtained second underlayer was 5 to 9 nm, and the SNRm was as high as 22.7 to 27.4 dB. These results were much better than those of the media of Comparative Examples 1 and 2.

Table 1 also shows that better results were obtained when at least one element selected from Ti, Pd, Pt, Rh, Zr, and Hf was used as the main component of the first underlayer.

In addition, the standard deviation of the grain diameter distribution was 1.1 nm, indicating good results.

EXAMPLE 6

A Pt target was prepared as a first underlayer, and an Mg-30 at % Si target was prepared as a second underlayer. A perpendicular magnetic recording medium was manufactured following the same procedures as in Example 1 except that the Pt target was used instead of the Ti target, and the Mg-30 at % Si target was used instead of the Al—Si target.

The obtained perpendicular magnetic recording medium has the same arrangement as the perpendicular magnetic recording medium shown in FIG. 4 except for the first and second underlayers.

TEM observation and image processing were performed on the second and third underlayers and the perpendicular magnetic recording layer of the obtained perpendicular magnetic recording medium, thereby checking the grain diameter distribution of crystal grains in each layer. Consequently, the second and third underlayers and the perpendicular magnetic recording layer were made of crystal grains having grain diameters of 5 to 8 nm, and the standard deviation of the grain diameter distribution was 1.2 nm or less. Also, a grain boundary region having a thickness of about 2 nm was observed between the crystal grains. In addition, a planar TEM image loaded into a computer in the same manner as in Example 1 was processed to perform two-dimensional fast Fourier transform, thereby evaluating the periodicity of the grain array in the second and third underlayers and the perpendicular magnetic recording layer. As a consequence, four distinct peaks were observed. This demonstrates that the grain array has two-dimensional regularity, and, from the arrangement of the peaks, this grain array has hexagonal symmetry.

Then, a local element concentration distribution in the second underlayer was checked by using TEM-EDX. Consequently, it was possible to confirm a structure including crystal grains mainly containing Mg and a grain boundary region mainly containing Si and surrounding each crystal grain.

When X-ray diffraction measurement was performed on the second underlayer, an Mg (00.2) peak was observed. When locking curve measurement was performed on this Mg (00.2) peak, the half-width of the peak was 7°.

Also, when X-ray diffraction measurement was performed on the perpendicular magnetic recording layer, a CoCrPt—$SiO_2$ (00.2) peak was observed. When locking curve measurement was performed on this CoCrPt—SiO$_2$ (00.2) peak, the half-width of the peak was 5°, i.e., the crystallinity was high.

When the recording/reproduction characteristics were evaluated in the same manner as in Example 1, the SNRm was 25.6 dB. Furthermore, the attenuation value at a low-frequency output of 50 kFCI was as high as −0.01 dB/decade.

Similarly, Ag, Ir, Ni, Pd, Rh, Hf, Re, Ru, Ta, Zr, Mg, and Al targets were prepared as first underlayers, and various perpendicular magnetic recording media were manufactured following the same procedures as in Example 1 except that these various targets were used instead of the Pt target.

Grain diameter observation of the second underlayer by TEM and recording/reproduction characteristic evaluation were performed on each obtained perpendicular magnetic recording medium in the same manner as in Example 1. The results are shown in Table 2 below.

TABLE 2

| First underlayer | Average grain diameter (nm) | SNRm (dB) |
|---|---|---|
| Ag | 9 | 21.2 |
| Ir | 8 | 22.3 |
| Ni | 8 | 23.2 |
| Re | 8 | 24.6 |
| Ru | 7 | 24.7 |
| Ta | 6 | 25.2 |
| Pd | 6 | 25.6 |
| Pt | 5 | 26.0 |
| Rh | 7 | 24.2 |
| Hf | 6 | 23.0 |
| Ti | 5 | 25.2 |
| Zr | 8 | 21.7 |
| Mg | 6 | 25.6 |
| Al | 8 | 22.3 |

Table 2 shows that when at least one element selected from Ag, Ir, Ni, Pt, Pd, Rh, Hf, Re, Ru, Ta, Zr, Mg, and Al was used as the material forming the first underlayer, the average grain diameter of the obtained second underlayer was 5 to 9 nm, and the SNRm was as high as 21.2 to 26.0 dB. These results were much better than those of the media of Comparative Examples 1 and 2.

EXAMPLE 7

An Al—Si composite target was prepared, and a perpendicular magnetic recording medium was manufactured following the same procedures as in Example 1 except that DC 500 W were discharged to this 15 target to form, on a Ti first underlayer, a first AlSi film having a composition ratio of Al-10 at % Si in the film and a film thickness of 1 nm, and, in the same manner as for the second underlayer of Example 1, DC 500 W were discharged to the target to form, on the first AlSi film, a second AlSi film having a composition ratio of Al-45 at % Si in the film and a thickness of 10 nm, thereby forming a stacked layer of the first and second AlSi films as the second underlayer.

Figure 9:
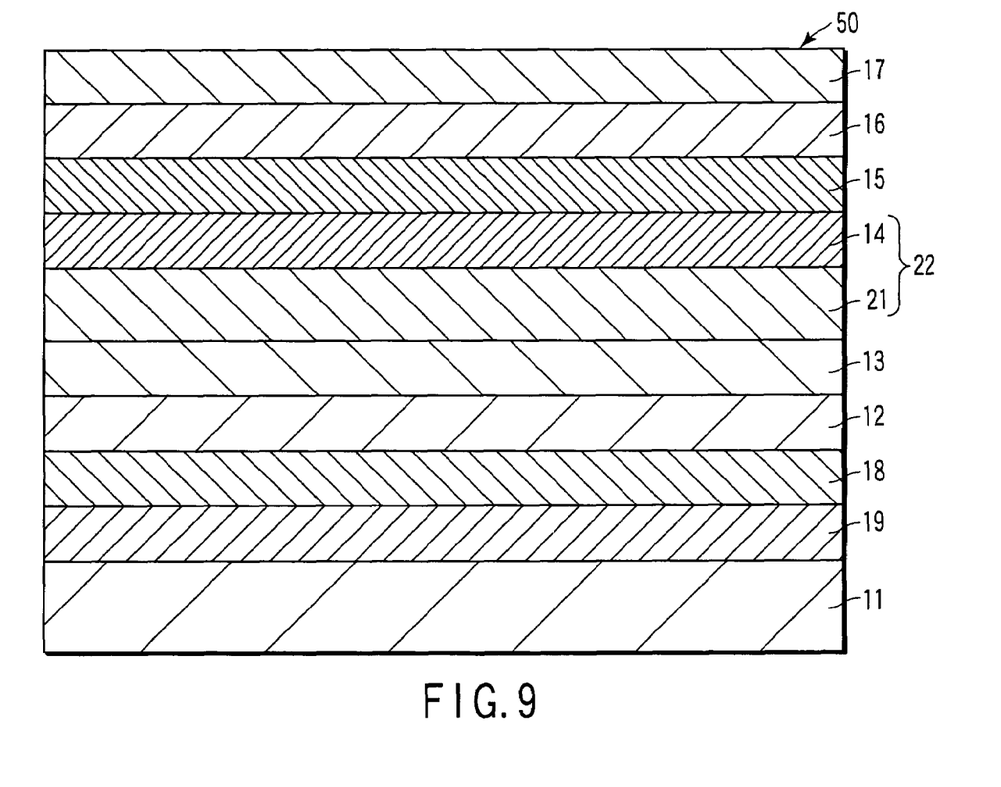
FIG. 9 is a sectional view schematically showing the arrangement of a perpendicular magnetic recording medium according to an embodiment of the present invention.

FIG. 9 is a schematic sectional view showing the arrangement of the obtained perpendicular magnetic recording medium. As shown in FIG. 9, this perpendicular magnetic recording medium has the same arrangement as shown in FIG. 4 except that a second underlayer 22 made up of a first Al-10 at % Si film 21 and second Al-45 at % Si film 13 is formed between a Ti first underlayer 13 and Ru third underlayer 15.

Grain diameter distribution measurement was performed on the obtained perpendicular magnetic recording medium in the same manner as in Example 1.

Consequently, each of the second and third underlayers and the perpendicular magnetic recording layer was made of crystal grains having a grain diameter of about 5 nm, and the standard deviation of the grain diameter distribution was 0.6 nm or less. In addition, a planar TEM image loaded into a computer in the same manner as in Example 1 was processed to perform two-dimensional fast Fourier transformation, thereby evaluating the periodicity of the grain array in the second and third underlayers and the perpendicular magnetic recording layer. As a consequence, four distinct peaks were observed. This demonstrates that the grain array has two-dimensional regularity, and, from the arrangement of the peaks, this grain array has hexagonal symmetry.

Also, a local element concentration distribution in the second underlayer was checked by using TEM-EDX. Consequently, it was possible to confirm a structure including crystal grains mainly containing Al and a grain boundary region mainly containing Si and surrounding each crystal grain. Then, the recording/reproduction characteristics were evaluated, and it was found that the SNRm was 27.6 dB, indicating good characteristics. Furthermore, the attenuation value at a low-frequency output of 50 kFCI was as high as −0.007 dB/decade.

Also, even when the film thickness of the Al-10 at % Si film was changed from 0.1 to 2 nm, equivalent characteristics were obtained.

EXAMPLE 8

Al-x at % Si composite targets (1 at %≦x≦50 at %) having various composition ratios were prepared.

Perpendicular magnetic recording media were manufactured following the same procedures as in Example 7 except that the Al-x at % Si composite targets were used to form 1-nm thick first AlSi films having various composition ratios on first underlayers, and Al-45 at % Si layers similar to the second underlayer of Example 1 were formed as second AlSi films.

The obtained perpendicular magnetic recording media have the same layer arrangement as the perpendicular magnetic recording medium shown in FIG. 9 except for the composition ratios in the first AlSi films.

In the same manner as in Example 1, grain diameter distribution measurement and recording/reproduction characteristic evaluation were performed on the second and third underlayers and the perpendicular magnetic recording layer of each obtained perpendicular magnetic recording medium.

Consequently, each of the second and third underlayers and the perpendicular magnetic recording layer was made of crystal grains having a grain diameter of about 5 nm. In addition, a planar TEM image loaded into a computer in the same manner as in Example 1 was processed to perform two-dimensional fast Fourier transformation, thereby evaluating the periodicity of the grain array in the second and third underlayers and the perpendicular magnetic recording layer. As a consequence, four distinct peaks were observed. This demonstrates that the grain array has two-dimensional regularity, and, from the arrangement of the peaks, this grain array has hexagonal symmetry. Also, a local element concentration distribution in each second underlayer was checked by using TEM-EDX. Consequently, it was possible to confirm a structure including crystal grains mainly containing Al and a grain boundary region mainly containing Si and surrounding each crystal grain. Then, X-ray diffraction measurement was performed on the second underlayer of each obtained perpendicular magnetic recording medium, thereby observing an Al (111) peak. When locking curve measurement was performed on this Al (111) peak, the half-width of the peak was 4° to 5° when the Si composition ratio was 5 to 30 at % (Al: 70 to 95 at %), i.e., the effect of improving the crystallinity was found.

Table 3 below shows the composition ratio in the film, the half-width of a locking curve in Al (111) representing the crystal alignment, and the SNRm.

TABLE 3

| Si content (at %) of first Al—Si film | Al (111) locking curve half-width (degrees) | SNRm (dB) |
|---|---|---|
| 1 | 9 | 26.5 |
| 3 | 8 | 27.2 |
| 5 | 5 | 27.5 |
| 10 | 4 | 28.6 |
| 15 | 4 | 28.3 |
| 20 | 5 | 27.8 |
| 30 | 5 | 27.5 |
| 40 | 8 | 27.4 |
| 50 | 9 | 27.3 |

Table 3 shows that the SNRm and crystal alignment improved when the Si composition ratio forming the grain boundary region of the first Al—Si film was 5 to 30 at % (the Al composition ratio was 70 to 95 at %), and more desirably, 10 to 15 at % (the Al composition ratio was 85 to 90 at %).

The attenuation values at a low-frequency output of 50 kFCI were as high as −0.006 to −0.012 dB/decade.

EXAMPLE 9

Al-x(y) at % Si composite targets (1 at %≦x(y)≦80 at %) having various composition ratios were prepared.

Perpendicular magnetic recording media were manufactured following the same procedures as in Example 7 except that the Al-x at % Si composite targets (1 at %≦x≦80 at %) were used to form 1-nm thick first AlSi films having various composition ratios as first AlSi films, and the Al-y at % Si composite targets (1 at %≦y≦80 at %) were used to form 10-nm thick second AlSi films having various composition ratios as second AlSi films.

The obtained perpendicular magnetic recording media have the same layer arrangement as the perpendicular magnetic recording medium shown in FIG. 9 except for the composition ratios in the first and second AlSi films.

In the same manner as in Example 1, grain diameter distribution measurement and recording/reproduction characteristic evaluation were performed on the second and third underlayers and the perpendicular magnetic recording layer of each of the obtained various perpendicular magnetic recording media.

Consequently, the second and third underlayers and the perpendicular magnetic recording layer were made of crystal grains having grain diameters of 5 to 7 nm. In addition, a planar TEM image loaded into a computer in the same manner as in Example 1 was processed to perform two-dimensional fast Fourier transformation, thereby evaluating the periodicity of the grain array in the second and third underlayers and the perpendicular magnetic recording layer. As a consequence, four distinct peaks were observed. This demonstrates that the grain array has two-dimensional regularity, and, from the arrangement of the peaks, this grain array has hexagonal symmetry.

Also, a local element concentration distribution in each second underlayer was checked by using TEM-EDX. Consequently, it was possible to confirm a structure including crystal grains mainly containing Al and a grain boundary region mainly containing Si and surrounding each crystal grain. Table 4 below shows the composition ratio in the film and the SNRm of each of the first AlSi films represented by Al-x at % Si and the second AlSi films represented by Al-y at % Si.

TABLE 4

| | | SNRm (dB) | | | | | | | | |
|---|---|---|---|---|---|---|---|---|---|---|
| | | Si content of second Al—Si film | | | | | | | | |
| | | 1 | 5 | 10 | 20 | 30 | 40 | 50 | 60 | 70 | 80 |
| Si content (at %) of first Al—Si film | 1 | — | 13.5 | 18.1 | 19.6 | 24.2 | 25.6 | 24.1 | 23.1 | 20.0 | 20.3 |
| | 5 | 14.5 | — | 17.7 | 19.7 | 25.1 | 26.0 | 25.9 | 23.4 | 22.1 | 22.4 |
| | 10 | 15.2 | 16.5 | — | 19.9 | 25.2 | 27.1 | 24.6 | 23.8 | 22.3 | 23.7 |
| | 20 | 16.4 | 16.8 | 18.6 | — | 25.5 | 26.6 | 23.7 | 24.7 | 22.6 | 23.2 |
| | 30 | 16.2 | 17.2 | 19.1 | 19.3 | — | 26.3 | 22.4 | 24.7 | 22.9 | 23.3 |
| | 40 | 16.8 | 17.9 | 19.8 | 19.7 | 19.0 | — | 21.3 | 23.5 | 21.4 | 21.6 |
| | 50 | 16.9 | 18.2 | 19.4 | 19.8 | 19.3 | 19.5 | — | 22.6 | 21.3 | 21.1 |
| | 60 | 17.1 | 18.8 | 19.2 | 18.6 | 18.5 | 19.5 | 15.1 | — | 20.1 | 20.6 |
| | 70 | 17.2 | 18.2 | 18.0 | 17.8 | 17.1 | 18.8 | 16.4 | 13.6 | — | 20.3 |
| | 80 | 10.0 | 18.1 | 17.4 | 17.5 | 16.1 | 17.5 | 15.8 | 12.9 | 11.0 | — |

As shown in Table 4, the characteristics improved when the Si content in the first AlSi film was smaller than that in the second AlSi film.

Also, the SNRm improved when the composition ratio of Si forming the crystal grains of the second AlSi film was 30 to 80 at % (the Al composition ratio was 20 to 70 at %).

EXAMPLE 10

An Rh target was prepared as a third underlayer, and a perpendicular magnetic recording medium was manufactured following the same procedures as in Example 1 except that a 15-nm thick Rh third underlayer was formed.

The obtained perpendicular magnetic recording medium has the same layer arrangement as that of the perpendicular magnetic recording medium shown in FIG. 4 except for the third underlayer. Grain diameter observation of the perpendicular magnetic recording layer by TEM and recording/reproduction characteristic evaluation were performed on the obtained perpendicular magnetic recording medium. The results are shown in Table 5.

Similarly, Pt, Pd, Ti, and Co-40 at % Cr targets were prepared as third underlayers, and various perpendicular magnetic recording media were manufactured following the same procedures as in Example 1 except that the targets made of these various materials were used instead of the Rh target. Grain diameter observation of the perpendicular magnetic recording layer by TEM and recording/reproduction characteristic evaluation were performed on each obtained perpendicular magnetic recording medium.

The average grain diameters of the perpendicular magnetic recording layers were as small as 5 to 6 nm, and the standard deviation of the grain diameter distribution was 0.6 nm. Also, the values of SNRm were as high as 27.0 to 27.4 dB.

The values of the average grain diameter and SNRm are shown in Table 5 below.

TABLE 5

| Third underlayer | Average grain diameter (nm) | SNRm (dB) |
| --- | --- | --- |
| Rh | 5 | 27.4 |
| Pt | 6 | 27.0 |
| Pd | 6 | 27.2 |
| Ti | 5 | 27.0 |
| Co-40 at % Cr | 5 | 27.1 |

Table 5 shows that when at least one element selected from Pt, Pd, Ti, Rh, and Co was used as the material forming the third underlayer, the crystal grain diameters in the third underlayer and perpendicular magnetic recording layer decreased, and the SNRm improved.

The attenuation values at a low-frequency output of 50 kFCI were as high as −0.005 to −0.12 dB.

EXAMPLE 11

A perpendicular magnetic recording medium of the present invention was obtained following the same procedures as in Example 1 except that after a soft magnetic backing layer was formed, first, second, and third underlayers, a perpendicular magnetic recording layer, and a protective layer were formed without lowering the temperature to room temperature, by using a Co-18 at % Cr-16 at % Pt-1 at % B target instead of the CoPtCr—SiO$_2$ perpendicular magnetic recording layer, and setting the thickness of this CoCrPtB perpendicular magnetic recording layer to 15 nm.

The obtained perpendicular magnetic recording medium has the same arrangement as the perpendicular magnetic recording medium shown in FIG. 4 except for the perpendicular magnetic recording layer.

Recording/reproduction characteristic evaluation was performed on the obtained perpendicular magnetic recording medium in the same manner as in Example 1. As a consequence, the SNRm was 26.7 dB, indicating good characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording medium comprising:
   a nonmagnetic substrate;
   a first underlayer formed on the nonmagnetic substrate, and containing, as a main component, at least one element selected from the group consisting, of Ag, Ir, Ni, Pd, Pt, Rh, Hf, Re, Ru, Ti, Ta, Zr, Mg, and Al;
   a second underlayer formed on and in contact with the first underlayer, and constituted of crystal grains consisting of one of Mg and Al, and a grain boundary region which consists of Si and surrounds the crystal grains;
   a third underlayer formed on the second underlayer, and containing, as a main component, at least one element selected from the group consisting of Pt, Pd, Ru, Rh, Co, and Ti; and
   a perpendicular magnetic recording layer formed on the third underlayer.

2. The medium according to claim 1, wherein the second underlayer consists of crystal grains consisting of Al, and a grain boundary region consisting of Si and surrounding the crystal grains.

3. The medium according to claim 1, wherein a content of Si in the second underlayer is 20 to 80 at %.

4. The medium according to claim 1, wherein in the second underlayer, an array of crystal grains in a longitudinal direction of the second underlayer has regularity.

5. The medium according to claim 1, wherein the second underlayer has a film thickness of 0.1 to 20 nm.

6. The medium according to anyone of claim 1, wherein the second underlayer has a film thickness of 1 to 10 nm.

7. The medium according to claim 1, wherein the first underlayer contains, as a main component, at least one element selected from the group consisting of Ag, Ir, Ni, Pd, Pt, Rh, Hf, Re, Ru, Ti, Ta, and Zr.

8. The medium according to claim 1, wherein the first underlayer contains, as a main component, at least one element selected from the group consisting of Ti, Pd, Pt, Zr, Rh, and Hf.

9. The medium according to claim 1, wherein the second underlayer consists of two layers consisting of the same element combination and having different composition ratios.

10. The medium according to claim 9, wherein an Si content in one a layer of the two layers, which is in contact with the first underlayer is smaller than an Si content in another a layer of the two layers, which is in contact with the third underlayer.

11. The medium according to claim 9, wherein in the second underlayer, an Si content in a layer in contact with the first underlayer is 5 to 30 at %.

12. The medium according to claim 11, wherein in the second underlayer, the Si content in the layer in contact with the first underlayer is 10 to 15 at %.

13. The medium according to claim 9, wherein in the second underlayer, a layer in contact with the first underlayer has a film thickness of 0.1 to 2 nm.

14. The medium according to claim 9, wherein in the second underlayer, an Si content in a layer in contact with the third underlayer is 30 to 80 at %.

15. The medium according to claim 1, wherein a difference between an average inter-grain distance of crystal grains of the third underlayer and an average inter-grain distance of the crystal grains of the second underlayer is not more than 10%.

16. The medium according to claim 1, wherein the magnetic recording layer contains magnetic crystal grains containing a CoPt alloy as a main component.

17. The medium according to claim 16, wherein in the magnetic recording layer, an array of magnetic crystal grains in a longitudinal direction of the magnetic recording layer has regularity.

18. The medium according to claim 1, further comprising a soft magnetic backing layer between the nonmagnetic substrate and first underlayer.

19. The medium according to claim 1, further comprising a protective layer on the magnetic recording layer.

20. A magnetic recording/reproduction apparatus comprising:
- a perpendicular magnetic recording medium having a nonmagnetic substrate,
- a first underlayer formed on the nonmagnetic substrate, and containing, as a main component, at least one element selected from the group consisting of Ag, Ir, Ni, Pd, Pt, Rh, Hf, Re, Ru, Ti, Ta, Zr, Mg, and Al,
- a second underlayer formed on and in contact with the first underlayer, and constituted of crystal grains consisting of one of Mg and Al, and a grain boundary region which consists of Si and surrounds the crystal grains;
- a third underlayer formed on the second underlayer, and containing, as a main component, at least one element selected from the group consisting of Pt, Pd, Ru, Rh, Co, and Ti; and
- a perpendicular magnetic recording layer formed on the third underlayer; and
- a recording/reproduction head.

21. The apparatus according to claim 20, wherein the magnetic recording/reproduction head is a single pole head.

22. The apparatus according to claim 20, wherein the second underlayer consists of crystal grains consisting of Al, and a grain boundary region consisting of Si and surrounding the crystal grains.

* * * * *